(12) United States Patent
Uno (10) Patent No.: US 8,438,194 B2
(45) Date of Patent: May 7, 2013

(54) INFORMATION PROCESSING APPARATUS, CONTROL METHOD FOR INFORMATION PROCESSING APPARATUS, AND STORAGE MEDIUM

(75) Inventor: Tsutomu Uno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 12/727,568

(22) Filed: Mar. 19, 2010

(65) Prior Publication Data

US 2010/0250632 A1 Sep. 30, 2010

(30) Foreign Application Priority Data

Mar. 27, 2009 (JP) ................................. 2009-079204

(51) Int. Cl.
*G06F 17/30* (2006.01)

(52) U.S. Cl.
USPC .......................................... 707/822; 711/166

(58) Field of Classification Search .................. 707/822, 707/999.001, 999.002
See application file for complete search history.

(56) References Cited

U.S. PATENT DOCUMENTS

| 5,978,812 | A | * | 11/1999 | Inokuchi et al. | ........ 707/999.004 |
| 6,016,507 | A | * | 1/2000 | Carroll et al. | ................... 709/217 |
| 7,502,944 | B2 | * | 3/2009 | Satake et al. | .................... 713/193 |
| 2004/0105018 | A1 | * | 6/2004 | Takahashi et al. | .......... 348/231.2 |
| 2007/0174367 | A1 | * | 7/2007 | Shapiro | .......................... 707/205 |
| 2010/0138619 | A1 | * | 6/2010 | Benavides | ..................... 711/159 |

FOREIGN PATENT DOCUMENTS

EP 2007/054264 * 5/2007

* cited by examiner

*Primary Examiner* — Yuk Ting Choi
(74) *Attorney, Agent, or Firm* — Fitzpatrick, Cella, Harper & Scinto

(57) ABSTRACT

An information processing apparatus that enhances reliability for complete deletion while shortening response time required for the next process to become executable. A request for deletion of a data file stored in a nonvolatile storage medium is issued. Based on the issuance of the deletion request, data composition information is acquired from file management information in the data file requested to be deleted. The acquired data composition information is moved to a complete deletion data file. The file management information in the data file requested to be deleted is completely deleted by overwriting. After the file management information is completely deleted, a data portion corresponding to the data composition information moved to the complete deletion data file is completely deleted by overwriting. After the data portion is completely deleted, the data composition information moved to the complete deletion data file is completely deleted.

9 Claims, 8 Drawing Sheets

INFORMATION PROCESSING APPARATUS, CONTROL METHOD FOR INFORMATION PROCESSING APPARATUS, AND STORAGE MEDIUM

BACKGROUND OF THE INVENTION

1. Field of the Invention

The present invention relates to an information processing apparatus that stores and manages data files, a control method for the information processing apparatus, and a computer-readable storage medium storing a control program for implementing the method.

2. Description of the Related Art

As a volume of data such as image data and video data handled by information processing apparatuses have been increasing, nonvolatile storage media such as a hard disk and a memory card are increasingly used as storage devices that temporarily store data during processing.

When data is stored in a nonvolatile storage medium, the data is recorded as a file managed by a file system (hereinafter referred to as a "data file"). Thus, when the data becomes unnecessary, the data file must be deleted by the file system.

The data file usually has file management information including data composition information such as index information in a data portion (for example, a data block list in a case where the data portion is managed on a block-to-block basis) and actual data, and is operated from an OS (operating system) by the file system.

As compared with a process in which only management information of a file is deleted when the file is deleted, a process in which actual data (data portion indicated by data composition information of a file to be deleted) as well is deleted is referred to as complete deletion. In complete deletion, data of an actual data portion is usually deleted by overwriting the actual data portion with overwrite data (predetermined values such as random numbers and "0") a plurality of times.

When complete deletion is carried out on the entire file in response to a request for deletion of large-amount data such as an image file, a heavy load is imposed on the process, and hence it takes a lot of time for the next process to become executable, which means that the response of the apparatus is slow.

Further, when power is turned off while a file is being deleted after complete deletion is started, there may be a case where a deletion process is interrupted, and after that, when the apparatus is started, the complete deletion is not continued. Thus, reliability for complete deletion is low.

SUMMARY OF THE INVENTION

The present invention provides an information processing apparatus and a control method for the information processing apparatus, which enhance reliability for complete deletion while shortening response time required for the next process to become executable, as well as a computer-readable storage medium storing a control program for implementing the method.

Accordingly, in a first aspect of the present invention, there is provided an information processing apparatus comprising an issuing unit adapted to issue a deletion request of a data file stored in a nonvolatile storage medium, an acquisition unit adapted to, based on the issuance of the deletion request by the issuing unit, acquire data composition information from file management information in the data file requested to be deleted, a moving unit adapted to move the data composition information acquired by the acquisition unit to a complete deletion data file, a first deleting unit adapted to completely delete the file management information in the data file requested to be deleted by overwriting, a second deleting unit adapted to, after the file management information is completely deleted by the first deleting unit, completely delete a data portion corresponding to the data composition information moved to the complete deletion data file by overwriting, and a third deleting unit adapted to, after the data portion is completely deleted by the second deleting unit, completely delete the data composition information moved to the complete deletion data file.

Accordingly, in a second aspect of the present invention, there is provided an information processing apparatus comprising, an issuing unit adapted to issue a deletion request of at least one of data files stored in a nonvolatile storage medium as a deletion target file, a moving unit adapted to overwrite data composition information in a dummy file stored in advance in the nonvolatile storage medium with data composition information in the deletion target file, a first deleting unit adapted to delete file management information in the deletion target file by overwriting with predetermined values, a second deleting unit adapted to, after the file management information in the deletion target file is deleted by the first deleting unit, delete a data portion in the deletion target file by referring to the data composition information of the dummy file, and a third deleting unit adapted to, after the data portion in the deletion target file is deleted by the second deleting unit, delete the data composition information of the dummy file.

Accordingly, in a third aspect of the present invention, there is provided a control method for an information processing apparatus, comprising an issuing step of issuing a deletion request of a data file stored in a nonvolatile storage medium, an acquisition step of, based on the issuance of the deletion request in the issuing step, acquiring data composition information from file management information in the data file requested to be deleted, a moving step of moving the data composition information acquired in the acquisition step to a complete deletion data file, a first deleting step of completely deleting the file management information in the data file requested to be deleted by overwriting, a second deleting step of, after the file management information is completely deleted in the first deleting step, completely deleting a data portion corresponding to the data composition information moved to the complete deletion data file by overwriting, and a third deleting step of, after the data portion is completely deleted in the second deleting step, completely deleting the data composition information moved to the complete deletion data file.

Accordingly, in a fourth aspect of the present invention, there is provided a computer-readable storage medium storing a control program for causing a computer to implementing a control method for an information processing apparatus, the control method comprising an issuing step of issuing a deletion request of a data file stored in a nonvolatile storage medium, an acquisition step of, based on the issuance of the deletion request in the issuing step, acquiring data composition information from file management information in the data file requested to be deleted, a moving step of moving the data composition information acquired in the acquisition step to a complete deletion data file, a first deleting step of completely deleting the file management information in the data file requested to be deleted by overwriting, a second deleting step of, after the file management information is completely deleted in the first deleting step, completely deleting a data portion corresponding to the data composition information moved to the complete deletion data file by overwriting, and a third deleting step of, after the data portion is completely deleted in the second deleting step, completely deleting the data composition information moved to the complete deletion data file.

According to the present invention, response time required for the next process to become executable can be shortened, and reliability for complete deletion can be enhanced.

Further features of the present invention will become apparent from the following description of exemplary embodiments (with reference to the attached drawings).

DESCRIPTION OF THE EMBODIMENTS

The present invention will now be described in detail with reference to the drawings showing embodiments thereof.

Figure 1:
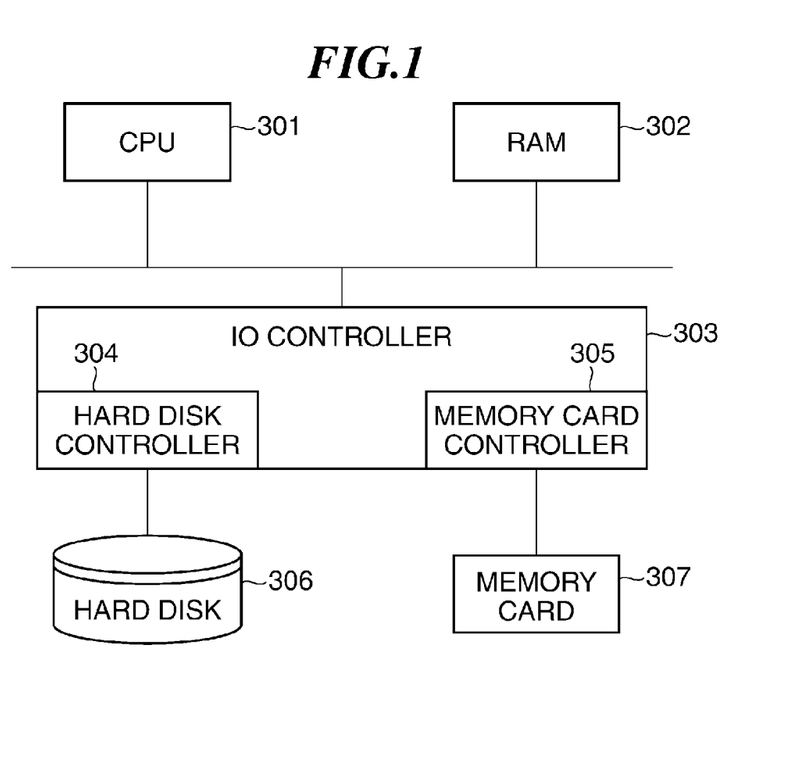
FIG. 1 is a block diagram useful in explaining an exemplary system arrangement of an information processing apparatus according to the present invention.

FIG. 1 shows an exemplary system arrangement of an information processing apparatus according to a first embodiment of the present invention.

Referring to FIG. 1, the information processing apparatus according to the present embodiment has a CPU 301, a RAM 302, and an IO controller 303. The IO controller 303 has a hard disk controller 304 and a memory card controller 305.

Image data, video data, and so on which are too large in size to be stored in the RAM 302 are temporarily stored as data files in a hard disk 306 or a memory card 307 as a nonvolatile storage medium via the IO controller 303. In this case, when the hard disk 306 is used, the hard disk controller 304 is used, and when the memory card 307 is used, the memory card controller 305 is used.

An OS running on the CPU 301 manages files and a file system, and file operations such as generation, writing, changing, deletion, and so on of files are issued as sector readout requests and write requests from the OS to the IO controller 303.

Figure 2:
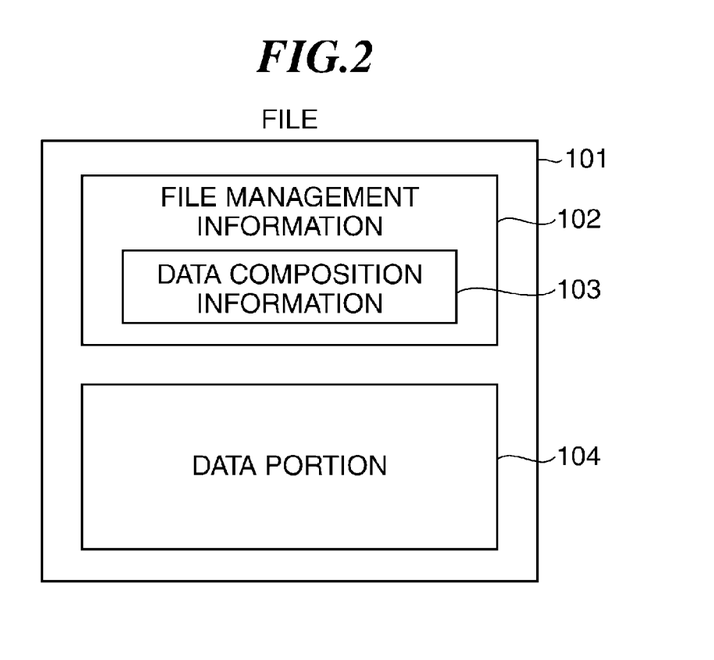
FIG. 2 is a diagram useful in explaining a typical file composition.

FIG. 2 shows a typical file composition.

Referring to FIG. 2, a file 101 is comprised of file management information 102, data composition information 103, and a data portion 104. When a file is deleted from the OS, part of the file management information 102 is changed to an unused state so as to reduce the load on file I/O and efficiently manage the system.

Figure 3:
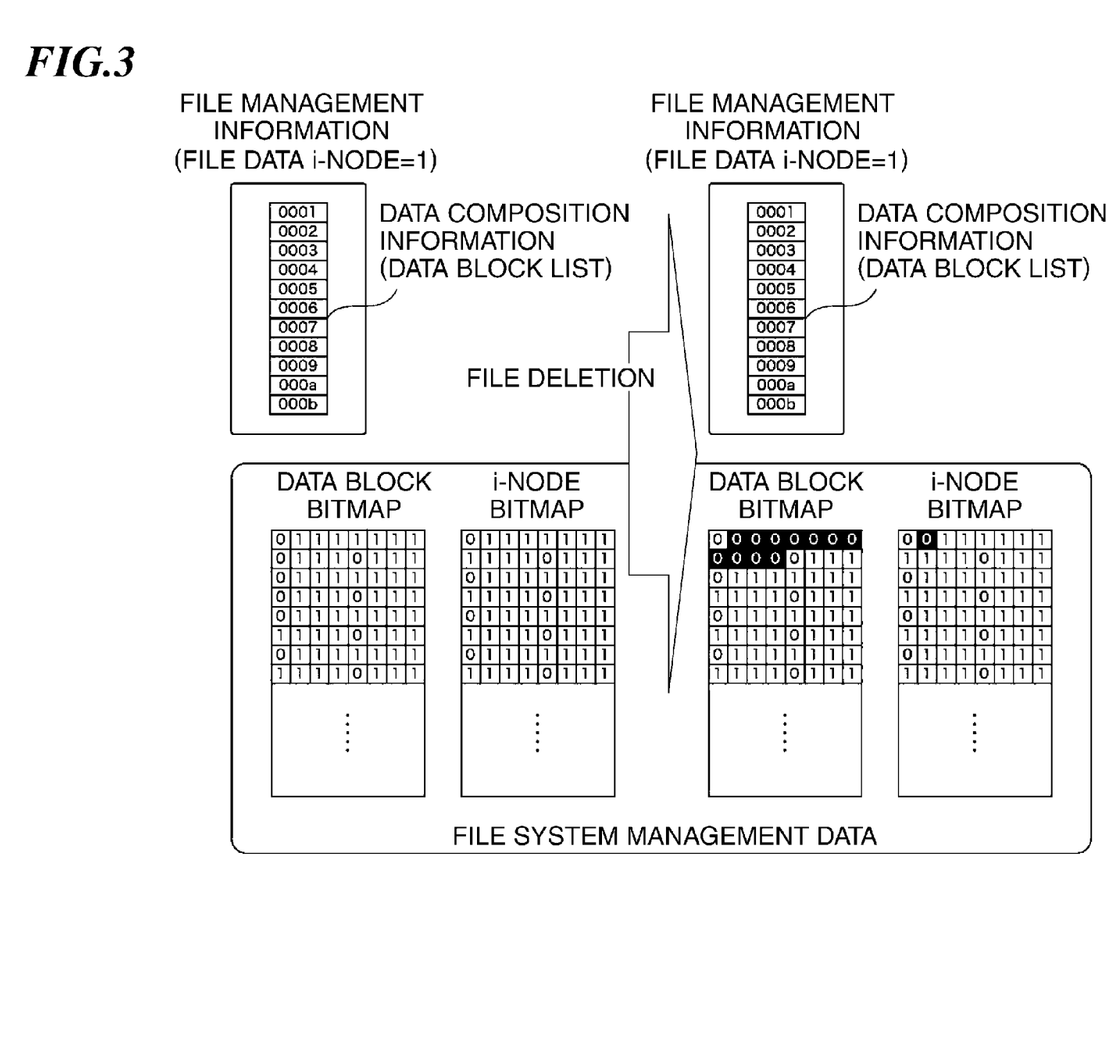
FIG. 3 is a conceptual diagram useful in explaining a typical file deletion process in an ext3 file system.

FIG. 3 shows a typical file deletion process in an ext3 file system commonly used in Linux. This process is to modify an i-node as file management information so that access to a file can be disabled.

Referring to FIG. 3, file data represented by i-node=1 (file management information 102) has list data (data composition information 103) indicative of numbers of data blocks constituting a file.

File system management data has a data block bitmap indicative of a status of use of data blocks, and an i-node bitmap indicative of a status of use of i-nodes representing respective files. It should be noted that on the bitmap, addresses are represented in rows, going from the upper left as the starting point (address "0") to the right, and shift from the right end to the left end of the next row. It should be noted that files at addresses "0001" to "000b" in the data block bitmap correspond to an address "0001" of the i-node bitmap.

When deletion of a file is instructed, a bit at an address "0001" of the corresponding i-node bitmap is changed from a used state (1) to an unused state (0).

Also, bits at addresses "0001" to "000b" of a data block bitmap indicative of a status of use of data blocks of the file to be deleted are changed from a used state (1) to an unused state (0) using the above-mentioned list data of file data. The data portion is unchanged.

Figure 4:
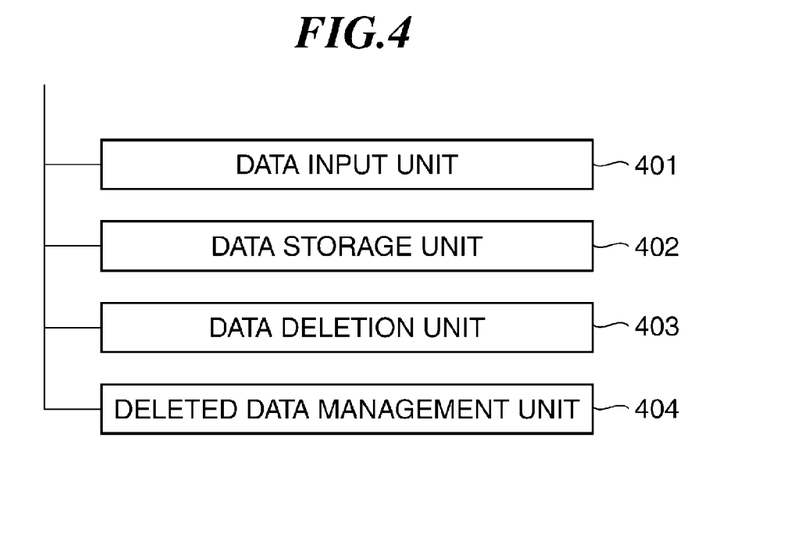
FIG. 4 is a control block diagram showing the information processing apparatus.

FIG. 4 shows an arrangement of the information processing apparatus according to the present embodiment.

Referring to FIG. 4, a data input unit 401, a data storage unit 402, a data deletion unit 403, and a deleted data management unit 404 execute respective processes under the control of the CPU 301.

The data input unit 401 executes a process to input image data, video data, and so on. The data storage unit 402 executes a storage process to store inputted image data, video data, and so on as data files in the hard disk 306 and the memory card 307. The data deletion unit 403 executes a process to issue a request to delete a data file stored in the hard disk 306 and the memory card 307.

The deleted data management unit 404 accepts a data deletion request issued by the data deletion unit 403, and acquires data composition information 103 from file management information 102 of a data file 101 requested to be deleted.

Also, the deleted data management unit 404 moves the data composition information 103 of the data file 101 requested to be deleted into file management information of a complete deletion data file created in advance. Here, the complete deletion data file is a dummy file prepared in advance, and has file management information and a data portion similarly to an actual data file. The file is configured to be inhibited from being written upon when the user creates a file normally. Specifically, the deleted data management unit 404 overwrites data composition information of the complete deletion data file as a dummy file with the data composition information 103 of the data file 101 requested to be deleted. Then, the deleted data management unit 404 completely deletes the file management information 102 of the data file 101 requested to be deleted by overwriting with data a plurality of times.

The deleted data management unit 404 may later delete the data portion 104 moved into the complete deletion data file by overwriting with data, and delete the data composition information 103 after completion of the deletion.

Figure 5:
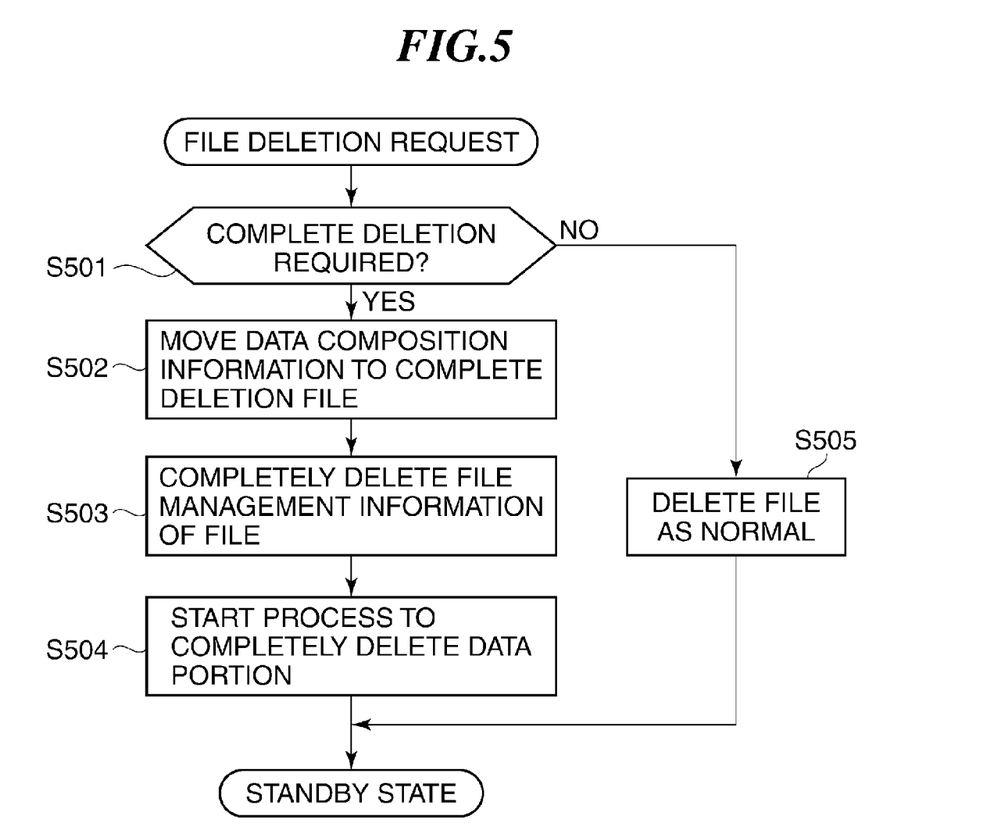
FIG. 5 is a flowchart useful in explaining processes carried out when deletion of a file is requested in the information processing apparatus.

Referring next to FIG. 5, a description will be given of processes carried out when a file is requested to be deleted in the information processing apparatus according to the present embodiment. The processes in FIG. 5 are executed by loading a control program stored in a ROM, the hard disk 306, or the like into the RAM 302 and executing the same by the CPU 301.

In step S501, when there is a request to delete a file, the CPU 301 determines whether or not the file is a data file required to be completely deleted. When the file is a data file required to be completely deleted, the CPU 301 proceeds to step S502, and when the file is a data file not required to be completely deleted, the CPU 301 proceeds to step S505.

Here, whether or not complete deletion is required is determined according to, for example, whether or not complete deletion has been explicitly requested. Alternatively, whether to carry out complete deletion may be set as operation modes of the apparatus (such as modes according to security levels), and whether or not complete deletion is required may be determined according to the setting. Still alternatively, whether or not complete deletion is required may be determined according to a type of original data, an information source thereof, a type of a process in which a file thereof is stored, and so on.

In the step S505, the CPU 301 executes the file deletion process (see FIG. 3) by clearing a file system management data flag, and makes a transition to a standby state.

In the step S502, the CPU 301 acquires data composition information 103 from file management information 102 of the data file requested to be deleted. Then, the CPU 301 moves the acquired data composition information 103 into file management information of a complete deletion data file created in advance, and proceeds to step S503.

In the step S503, the CPU 301 deletes the file management information 102 of the data file requested to be deleted by overwriting with random values a predetermined number of times. Then, the CPU 301 clears an i-node bitmap indicative of a status of use of the corresponding file.

Next, in step S504, the CPU 301 starts complete deleting the data portion 104, and makes a transition to a standby state. It should be noted that how to completely delete the data portion 104 will be described later with reference to FIG. 7.

Figure 6:
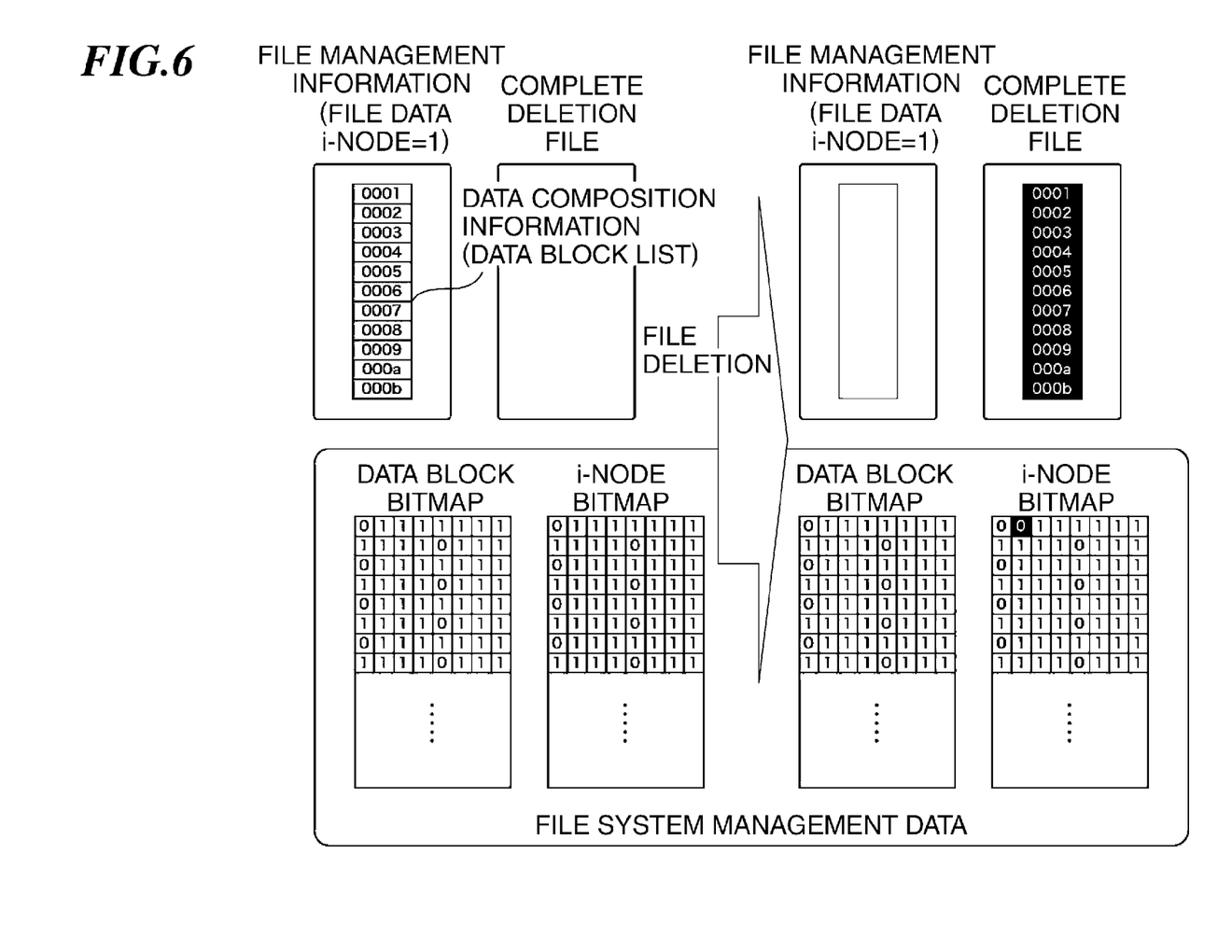
FIG. 6 is a diagram conceptually showing contents of a process carried out when deletion of a file is requested.

FIG. 6 is a conceptual diagram showing contents of a process carried out when deletion of a file is requested.

As shown in FIG. 6, data composition information 103 of file management information 102 of a data file to be deleted moves to file management information of a complete deletion data file, and bits of an i-node bitmap corresponding to the data file to be deleted are cleared to 0.

In this process, because deletion of data blocks is not executed, a bitmap of data blocks is not cleared but maintained in a used state.

Figure 7:
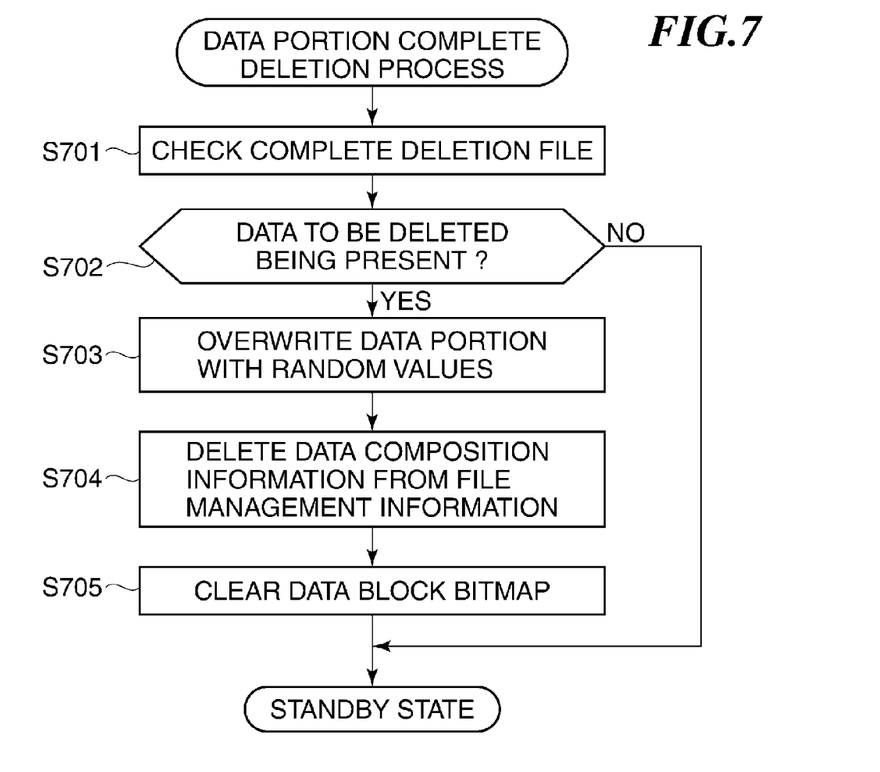
FIG. 7 is a flowchart useful in explaining how to completely delete a data portion in step S504 in FIG. 5.

Referring next to FIG. 7, a description will be given of how to completely delete the data portion 104 in the step S504 in FIG. 5.

Here, the complete deletion process of the data portion 104 may not be immediately executed upon a file deletion request, but may be given a lower priority than other processes and executed in the background.

In step S701 and step S702, the CPU 301 ascertainers whether or not data blocks that should be deleted are registered in data composition information of a complete deletion data file. Then, when the data blocks that should be deleted are registered, the CPU 301 proceeds to step S703, and when the data blocks that should be deleted are not registered, the CPU 301 makes a transition to a standby state.

In the step S703, the CPU 301 (second deleting unit) deletes the data portion 104 by overwriting the data blocks that should be deleted with random values a predetermined number of times, and proceeds to step S704.

In the step S704, the CPU 301 (third deleting unit) deletes data composition information indicative of the data blocks whose data portion has been deleted, and proceeds to step S705.

In the step S705, the CPU 301 clears a data block bitmap corresponding to the data composition information deleted in the step S704, and makes a transition to the standby state.

Figure 8:
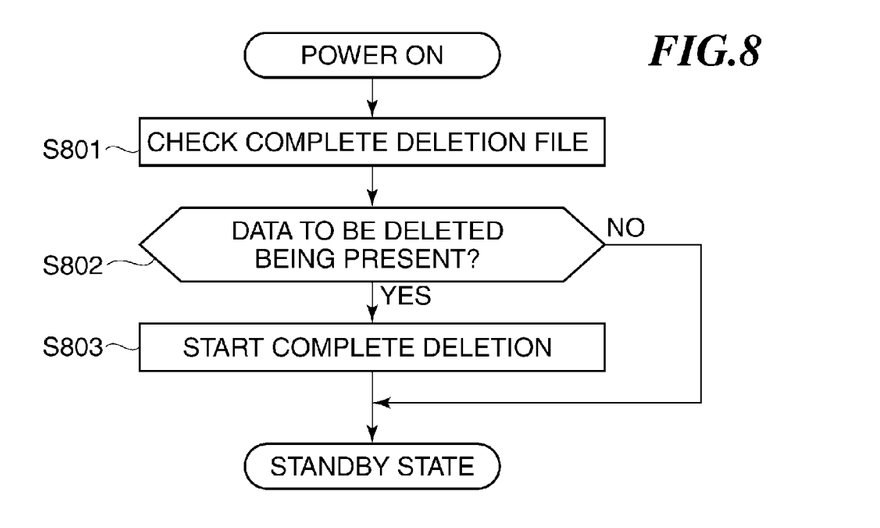
FIG. 8 is a flowchart useful in explaining processes carried out at power-on of the information processing apparatus.

Referring next to FIG. 8, a description will be given of processes carried out at power-on of the information processing apparatus according to the present embodiment. The processes in FIG. 8 are executed by loading a control program stored in a ROM, the hard disk 306, or the like into the RAM 302, and executing the same by the CPU 301.

In step S801 and step S802, when power is turned on, the CPU 301 ascertainers whether or not data blocks that should be deleted are registered in data composition information of file management information of a complete deletion data file. Then, when the data blocks that should be deleted are registered, the CPU 301 proceeds to step S803, and when the data blocks that should be deleted are not registered, the CPU 301 makes a transition to the standby state.

In the step S803, the CPU 301 resumes the same complete deletion process on the data portion as in the steps S703 to S705 in FIG. 7, and makes a transition to the standby state.

As described above, according to the present embodiment, when deletion of a file is requested, data composition information of file management information of a data file to be deleted is moved to file management information of a complete deletion data file created in advance. Then, only the file management information of the data file requested to be deleted is completely deleted, and later on, a data portion moved to the complete deletion data file is completely deleted. As a result, response time required for the next process to become executable can be shortened, and reliability for complete deletion can be enhanced.

Moreover, when power is turned on, it is ascertained whether or not data blocks that should be deleted are registered in data composition information of file management information of a complete deletion data file, and when the data blocks that should be deleted are registered, the same process to completely delete a data portion as described above is resumed. Thus, even if power is turned off during the process to completely delete data, the process to completely delete data can be automatically continued when power is turned on again.

Figure 9:
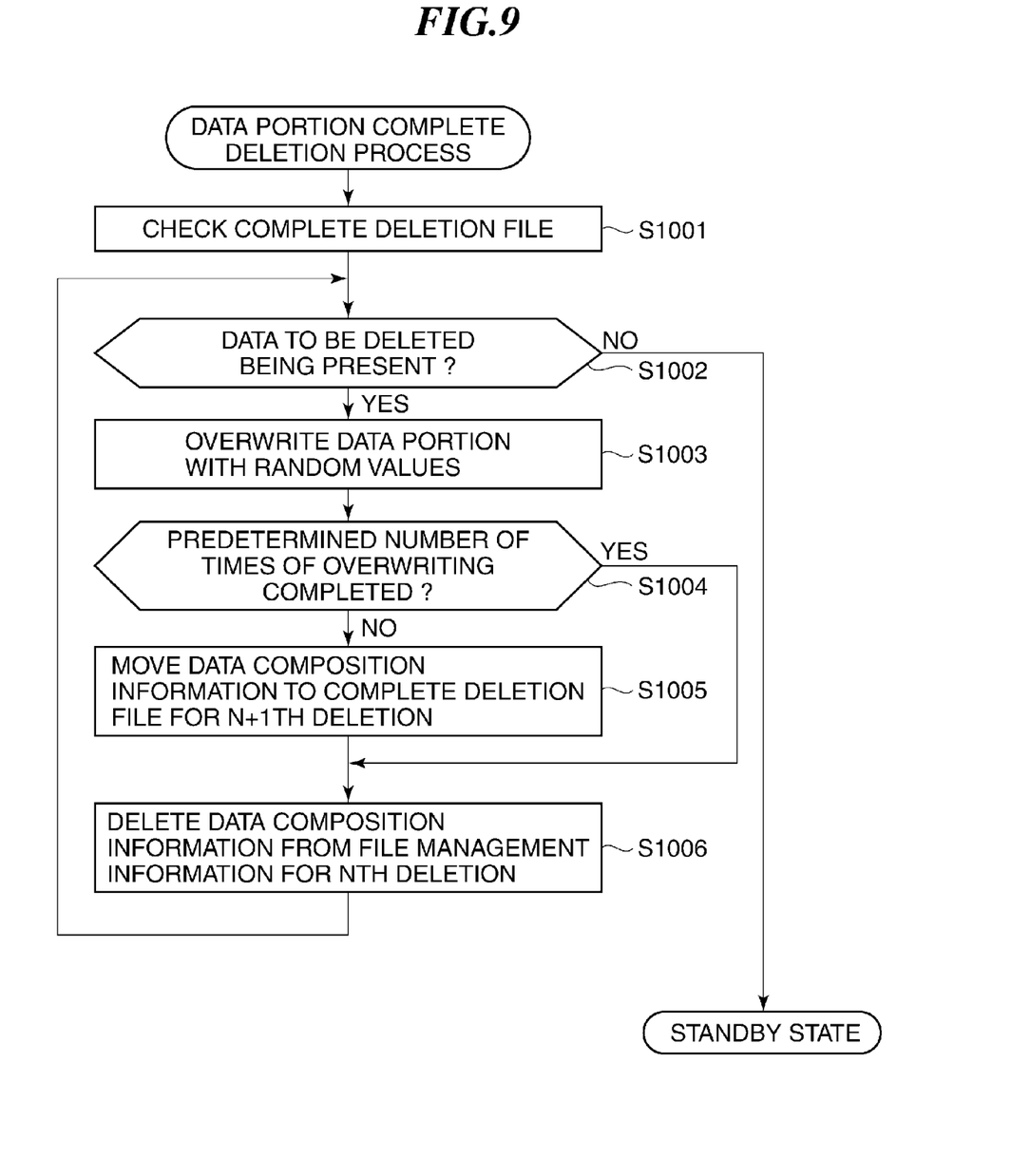
FIG. 9 is a flowchart useful in explaining how to completely delete a data portion in the information processing apparatus according to the present embodiment.
Figure 10:
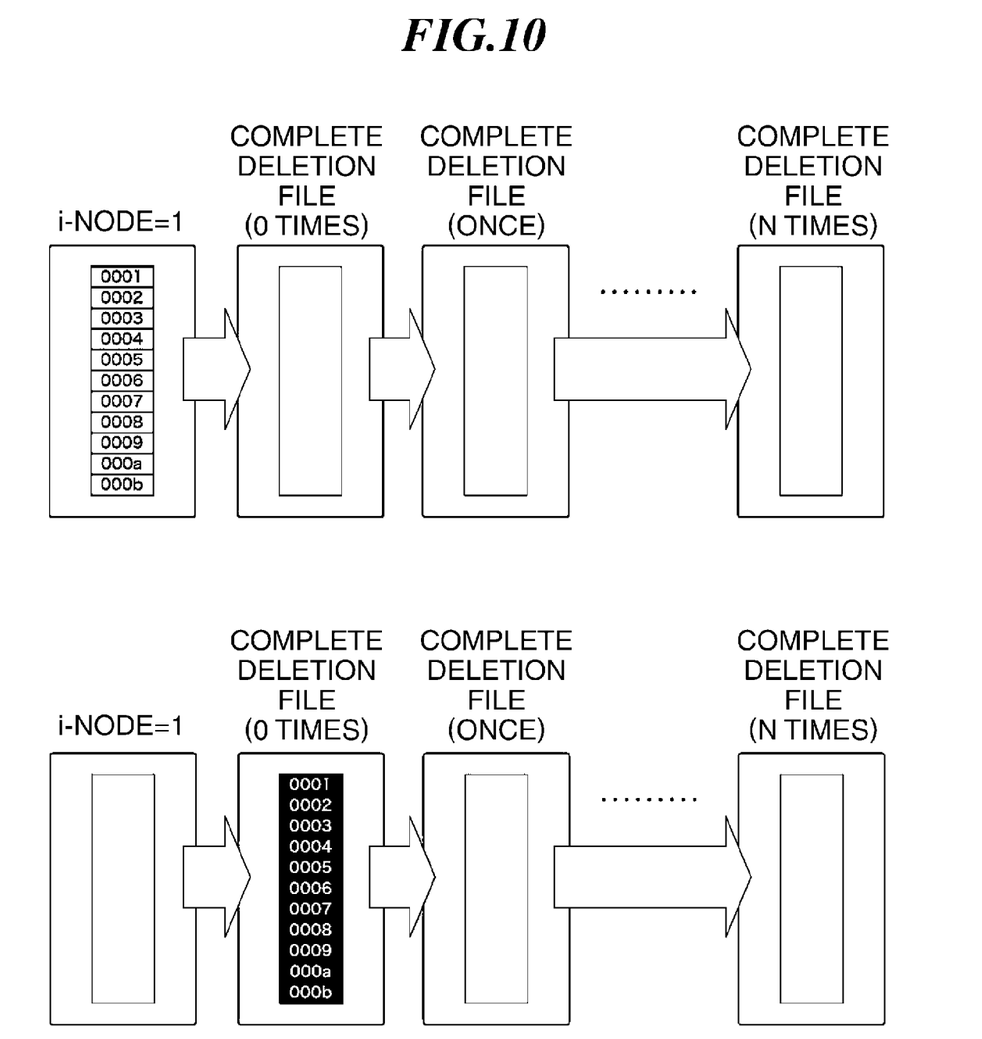
FIG. 10 is a diagram useful in explaining a process in which data composition information is moved to another complete deletion data file whenever a data portion is deleted.
Figure 11:
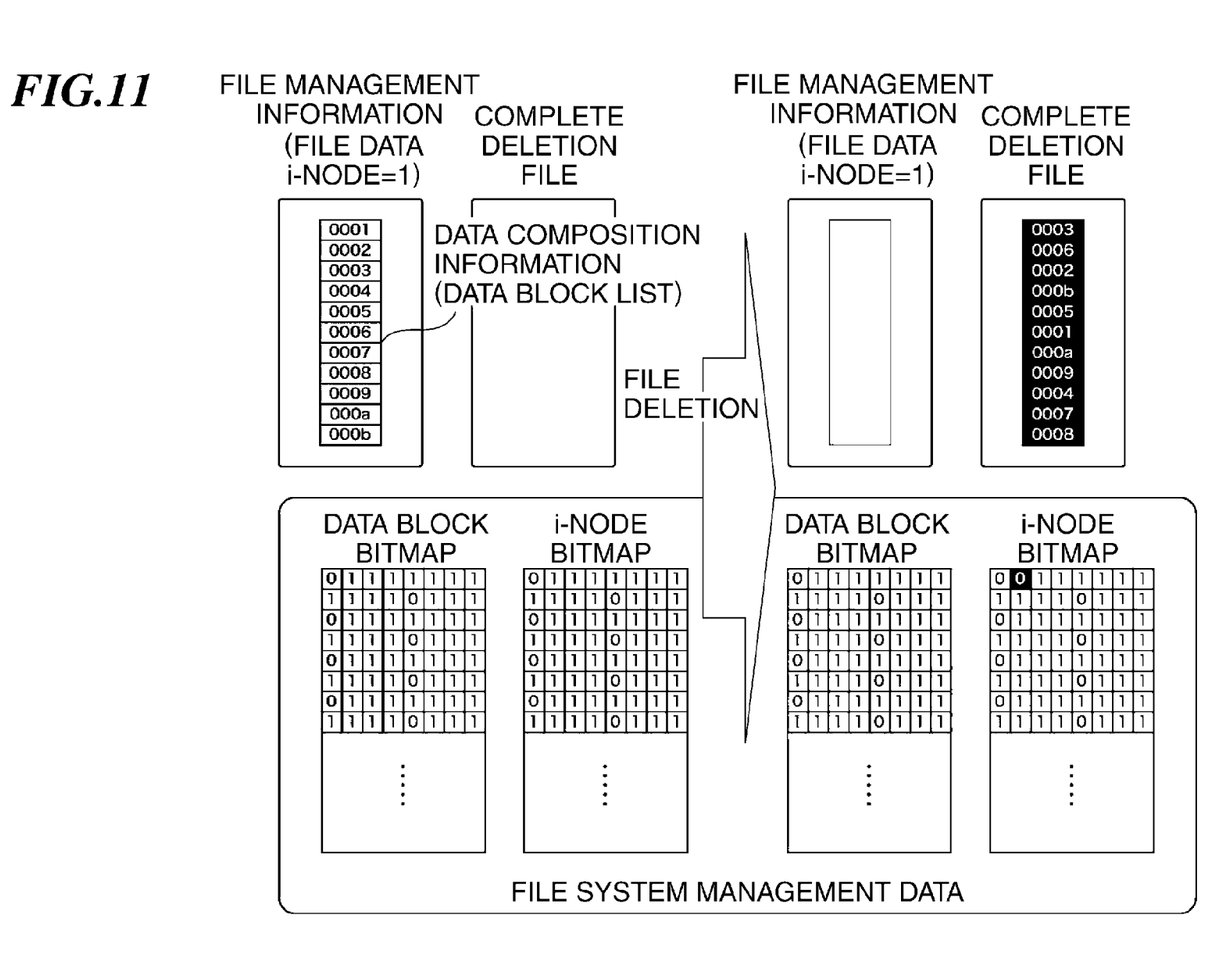
FIG. 11 is a diagram useful in explaining an example where a sorting order of data is randomly changed when data composition information is moved to a complete deletion data file.

Referring next to FIGS. 9 and 10, a description will be given of an information processing apparatus according to a second embodiment of the present invention. It should be noted that in the following description, elements and parts which are identical with those of the first embodiment described above are designated by identical figures and reference numerals.

FIG. 9 is a flowchart useful in explaining how to completely delete a data portion (corresponding to the step S504 in FIG. 5) in the information processing apparatus according to the present embodiment. Processes in FIG. 9 are executed by loading a control program stored in a ROM, the hard disk 306, or the like into the RAM 302 and executing the same by the CPU 301.

In step S1001 and step S1002, when the data portion complete deletion process is started, the CPU 301 ascertains whether or not data blocks that should be deleted are registered in data composition information of file management information of a complete deletion data file. Then, when the data blocks that should be deleted are registered, the CPU 301 proceeds to step S1003, and when the data blocks that should be deleted are not registered, the CPU 301 makes a transition to a standby state.

In the step S1003, the CPU 301 deletes data by overwriting the data blocks with random values, and proceeds to step S1004.

In the step S1004, the CPU 301 determines whether or not the number of times of overwriting with the random values in the step S1003 has reached a predetermined number of times. When the overwriting has reached the predetermined number of times, the CPU 301 proceeds to step S1006, and when the overwriting has not reached the predetermined number of times, the CPU 301 proceeds to step S1005.

In the step S1005, the CPU 301 moves the data composition information from the complete deletion data file (for the Nth deletion) in the step S1001 to a complete deletion data file (for the N+1th deletion) created separately, and proceeds to the step S1006.

Namely, in the present embodiment, as shown in FIG. 10, complete deletion data files corresponding in number to the number of deletions of a data portion are created, and whenever a data portion is deleted, data composition information is moved to another complete deletion data file.

In the step S1006, the CPU 301 deletes the data composition information from the file management information of the complete deletion data file for the Nth deletion, clears bits of an i-node bitmap corresponding to the file to be deleted to 0, and returns to the step 51002. Other arrangements and operational effects are the same as those in the first embodiment.

It should be noted that the present invention is not limited to the embodiments described above, but certain changes and modifications may be possible within the scope of the present invention.

For example, although in the embodiments described above, the file deletion process is executed by the ext3 file system commonly used in Linux, the present invention may be practiced using other file systems such as FAT.

Moreover, in the embodiments described above, when data composition information is to be moved to (overwrite) a complete deletion data file, a sorting order of data may be randomly changed. Namely, because data composition information is indicative of which blocks store a data portion of a file (positional information and addresses) as well as the sorting order thereof, the indicated sorting order may be changed when the data composition information is moved.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-079204 filed Mar. 27, 2009, which is hereby incorporated by reference herein in its entirety.

What is claimed is:

1. An information processing apparatus comprising:
a processor and memory, cooperating to function as:
an issuing unit configured to issue a deletion request of a deletion target file stored in a nonvolatile storage medium;
an acquisition unit configured to, based on the issuance of the deletion request by said issuing unit, acquire a data block list describing how a data portion of the deletion target file is composed, from file management information in the deletion target file;
a moving unit configured to move only the data block list of the deletion target file to a dummy file;
a first deleting unit configured to delete the file management information in the deletion target file by overwriting;
a second deleting unit configured to, after the file management information is deleted by said first deleting unit, delete the data portion corresponding to the data block list in the dummy file by overwriting; and
a third deleting unit configured to, after the data portion is deleted by said second deleting unit, delete the data block list in the dummy file.

2. The information processing apparatus according to claim 1, wherein said second deleting unit deletes the data portion corresponding to the data block list in the dummy file by overwriting the data portion with random values a predetermined number of times.

3. The information processing apparatus according to claim 1, wherein whenever a data portion corresponding to data block list in a dummy file is deleted by overwriting, said second deleting unit moves the data block list from the dummy file to another dummy file.

4. The information processing apparatus according to claim 1, wherein said moving unit randomly changes a sorting order of data when moving the data block list to the dummy file.

5. The information processing apparatus according to claim 1, said processor and memory cooperating to further function as
an ascertaining unit configured to ascertain whether the data block list is included in the dummy file when power is turned on,
wherein when said ascertaining unit ascertains that the data block list is included in the dummy file, processes by said first deleting unit, said second deleting unit, and said third deleting unit are resumed.

6. An information processing apparatus comprising:
a processor and memory, cooperating to function as:
an issuing unit configured to issue a deletion request of at least one of data files stored in a nonvolatile storage medium as a deletion target file;
a moving unit configured to move only a data block list of the deletion target file describing how a data portion of the deletion target file is composed, to a dummy file stored in advance in the nonvolatile storage medium;
a first deleting unit configured to delete file management information in the deletion target file by overwriting with predetermined values;
a second deleting unit configured to, after the file management information in the deletion target file is deleted by said first deleting unit, delete the data portion of the deletion target file by referring to the data block list in the dummy file; and a third deleting unit configured to, after the data portion of the deletion target file is deleted by said second deleting unit, delete the data block list in the dummy file.

7. The information processing apparatus according to claim 6, wherein the data portion of the deletion target file is stored as a plurality of blocks in the storage medium, and the data block list has addresses of the blocks and sorting sequences thereof, and said moving unit changes a sorting sequence of the data block list in the dummy file.

8. A control method for an information processing apparatus, comprising:

an issuing step of issuing a deletion request of a deletion target file stored in a nonvolatile storage medium;

an acquisition step of, based on the issuance of the deletion request in said issuing step, acquiring a data block list describing how a data portion of the deletion target file is composed, from file management information in the deletion target file;

a moving step of moving only the data block list of the deletion target acquired in said acquisition step to a dummy file;

a first deleting step of deleting the file management information in the deletion target file by overwriting;

a second deleting step of, after the file management information is deleted in said first deleting step, deleting the data portion corresponding to the data block list in the dummy file by overwriting; and a third deleting step of, after the data portion is deleted in said second deleting step, deleting the data block list in the dummy file.

9. A non-transitory computer-readable storage medium storing a control program for causing a computer to execute a control method for an information processing apparatus, the control method comprising:

an issuing step of issuing a deletion request of a deletion target file stored in a nonvolatile storage medium;

an acquisition step of, based on the issuance of the deletion request in said issuing step, acquiring a data block list describing how a data portion of the deletion target file is composed, from file management information in said deletion target file;

a moving step of moving only the data block list of the deletion target file to a dummy file;

a first deleting step of deleting the file management information in the deletion target file by overwriting;

a second deleting step of, after the file management information is deleted in said first deleting step, deleting the data portion corresponding to the data block list in the dummy file by overwriting; and a third deleting step of, after the data portion is deleted in said second deleting step, deleting the data block list in the dummy file.

* * * * *